US008916494B2

(12) United States Patent
McDaniel et al.

(10) Patent No.: US 8,916,494 B2
(45) Date of Patent: Dec. 23, 2014

(54) VAPOR PHASE PREPARATION OF FLUORIDED SOLID OXIDES

(75) Inventors: Max P. McDaniel, Bartlesville, OK (US); Kathy S. Collins, Bartlesville, OK (US); Qing Yang, Bartlesville, OK (US); Tony R. Crain, Niotaze, KS (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 82 days.

(21) Appl. No.: 13/594,906

(22) Filed: Aug. 27, 2012

(65) Prior Publication Data

US 2014/0058054 A1    Feb. 27, 2014

(51) Int. Cl.
C08F 4/02       (2006.01)
C08F 4/60       (2006.01)
C08F 4/6592     (2006.01)
C08F 10/00      (2006.01)

(52) U.S. Cl.
USPC ........... 502/439; 502/103; 502/104; 502/119; 502/120; 502/152; 526/129; 526/130; 526/160; 526/348; 526/943

(58) Field of Classification Search
CPC .............. C08F 4/02; C08F 4/025; C08F 4/60; C08F 4/6592; C08F 10/00
USPC .................. 502/103, 104, 119, 120, 152, 439; 526/129, 130, 160, 348, 943
See application file for complete search history.

(56) References Cited

U.S. PATENT DOCUMENTS

| | | |
|---|---|---|
| 2,825,721 A | 3/1958 | Hogan et al. |
| 3,119,569 A | 1/1964 | Baricordi |
| 3,225,023 A | 12/1965 | Hogal et al. |
| 3,226,205 A | 12/1965 | Rohlfing |
| 3,242,099 A | 3/1966 | Manyik |
| 3,248,179 A | 4/1966 | Norwood |
| 3,622,521 A | 11/1971 | Hogan et al. |
| 3,625,864 A | 12/1971 | Horvath |
| 3,843,747 A | 10/1974 | Kravitz et al. |
| 3,887,494 A | 6/1975 | Dietz |
| 3,900,457 A | 8/1975 | Witt |
| 3,976,632 A | 8/1976 | DeLap |
| 4,053,436 A | 10/1977 | Hogan et al. |
| 4,081,407 A | 3/1978 | Short et al. |
| 4,130,505 A | 12/1978 | Nasser, Jr. et al. |
| 4,151,122 A | 4/1979 | McDaniel et al. |
| 4,182,815 A | 1/1980 | McDaniel et al. |
| 4,247,421 A | 1/1981 | McDaniel et al. |
| 4,248,735 A | 2/1981 | McDaniel et al. |
| 4,296,001 A | 10/1981 | Hawley |
| 4,297,460 A | 10/1981 | McDaniel et al. |
| 4,301,034 A | 11/1981 | McDaniel |
| 4,339,559 A | 7/1982 | McDaniel |
| 4,364,842 A | 12/1982 | McDaniel et al. |
| 4,364,854 A | 12/1982 | McDaniel et al. |
| 4,364,855 A | 12/1982 | McDaniel et al. |
| 4,392,990 A | 7/1983 | Witt |
| 4,397,766 A | 8/1983 | Hawley et al. |
| 4,405,501 A | 9/1983 | Witt |
| 4,444,962 A | 4/1984 | McDaniel et al. |
| 4,444,964 A | 4/1984 | McDaniel et al. |
| 4,444,965 A | 4/1984 | McDaniel et al. |
| 4,460,756 A | 7/1984 | McDaniel et al. |
| 4,501,885 A | 2/1985 | Sherk et al. |
| 4,504,638 A | 3/1985 | McDaniel et al. |
| 4,547,557 A | 10/1985 | McDaniel |
| 4,588,790 A | 5/1986 | Jenkins |
| 4,735,931 A | 4/1988 | McDaniel et al. |
| 4,794,096 A | 12/1988 | Ewen |
| 4,806,513 A | 2/1989 | McDaniel et al. |
| 4,808,561 A | 2/1989 | Welborn |
| 4,820,785 A | 4/1989 | McDaniel et al. |
| 4,855,271 A | 8/1989 | McDaniel et al. |
| 4,939,217 A | 7/1990 | Stricklen |
| 4,981,831 A | 1/1991 | Knudsen et al. |
| 4,988,657 A | 1/1991 | Martin et al. |
| 5,037,911 A | 8/1991 | McDaniel et al. |
| 5,179,178 A | 1/1993 | Stacy et al. |
| 5,191,132 A | 3/1993 | Patsidis et al. |
| 5,210,352 A | 5/1993 | Alt et al. |
| 5,219,817 A | 6/1993 | McDaniel et al. |
| 5,221,654 A | 6/1993 | McDaniel et al. |
| 5,237,025 A | 8/1993 | Benham et al. |
| 5,244,990 A | 9/1993 | Mitchell |
| 5,275,992 A | 1/1994 | Mitchell et al. |
| 5,347,026 A | 9/1994 | Patsidis et al. |
| 5,352,749 A | 10/1994 | DeChellis |
| 5,399,636 A | 3/1995 | Alt et al. |
| 5,401,817 A | 3/1995 | Palackal et al. |
| 5,420,320 A | 5/1995 | Zenk et al. |
| 5,436,304 A | 7/1995 | Griffin |
| 5,436,305 A | 7/1995 | Alt et al. |
| 5,451,649 A | 9/1995 | Zenk et al. |
| 5,455,314 A | 10/1995 | Burns |
| 5,480,848 A | 1/1996 | Geerts |
| 5,496,781 A | 3/1996 | Geerts et al. |
| 5,498,581 A | 3/1996 | Welch et al. |
| 5,541,272 A | 7/1996 | Schmid et al. |
| 5,554,795 A | 9/1996 | Frey et al. |

(Continued)

FOREIGN PATENT DOCUMENTS

WO    9960033      11/1999
WO    2005037431   4/2005

OTHER PUBLICATIONS

Advances in Catalysis, vol. 53, Burlington: Academic Press, 2010, pp. 123-127.
Hawley's Condensed Chemical Dictionary, John Wiley & Sons, 11th Ed., (1995), 3 pages.
Cotton, F.A., et al., "Advanced Inorganic Chemistry," 6th Ed., Wiley-Interscience, (1999), 4 pages.
International Search Report for PCT/US2013/056606 dated Jan. 21, 2014.

Primary Examiner — Caixia Lu
(74) Attorney, Agent, or Firm — Merchant & Gould

(57) ABSTRACT

Methods for the vapor phase preparation of fluorided solid oxide activator-supports, using certain calcining temperatures and fluoriding temperatures, are disclosed.

19 Claims, 1 Drawing Sheet

(56) References Cited

U.S. PATENT DOCUMENTS

| | | | |
|---|---|---|---|
| 5,563,284 A | 10/1996 | Frey et al. |
| 5,565,175 A | 10/1996 | Hottovy |
| 5,565,592 A | 10/1996 | Patsidis et al. |
| 5,571,880 A | 11/1996 | Alt et al. |
| 5,575,979 A | 11/1996 | Hanson |
| 5,576,259 A | 11/1996 | Hasegawa et al. |
| 5,594,078 A | 1/1997 | Welch et al. |
| 5,610,247 A | 3/1997 | Alt et al. |
| 5,627,247 A | 5/1997 | Alt et al. |
| 5,631,203 A | 5/1997 | Welch et al. |
| 5,631,335 A | 5/1997 | Alt et al. |
| 5,654,454 A | 8/1997 | Peifer et al. |
| 5,668,230 A | 9/1997 | Schertl et al. |
| 5,705,478 A | 1/1998 | Boime |
| 5,705,579 A | 1/1998 | Hawley et al. |
| 5,807,938 A | 9/1998 | Kaneko et al. |
| 5,919,983 A | 7/1999 | Rosen et al. |
| 6,239,235 B1 | 5/2001 | Hottovy |
| 6,262,191 B1 | 7/2001 | Hottovy |
| 6,300,271 B1 | 10/2001 | McDaniel |
| 6,355,594 B1 | 3/2002 | McDaniel |
| 6,395,666 B1 | 5/2002 | McDaniel |
| 6,548,442 B1 | 4/2003 | McDaniel |
| 6,613,712 B1 | 9/2003 | McDaniel et al. |
| 6,653,416 B2 | 11/2003 | McDaniel et al. |
| 6,831,141 B2 | 12/2004 | McDaniel et al. |
| 6,833,338 B2 | 12/2004 | McDaniel et al. |
| 6,833,415 B2 | 12/2004 | Kendrick |
| 6,992,032 B2 | 1/2006 | McDaniel et al. |
| 7,226,886 B2 | 6/2007 | Jayaratne et al. |
| 7,294,599 B2 | 11/2007 | Jensen et al. |
| 7,312,283 B2 | 12/2007 | Martin et al. |
| 7,390,764 B2 | 6/2008 | McDaniel et al. |
| 7,417,097 B2 | 8/2008 | Yu et al. |
| 7,601,665 B2 | 10/2009 | McDaniel et al. |
| 7,619,047 B2 | 11/2009 | Yang et al. |
| 7,884,163 B2 | 2/2011 | McDaniel et al. |
| 8,114,946 B2 | 2/2012 | Yang et al. |
| 8,309,485 B2 | 11/2012 | Yang et al. |
| 2010/0322836 A1 | 12/2010 | Benham et al. |

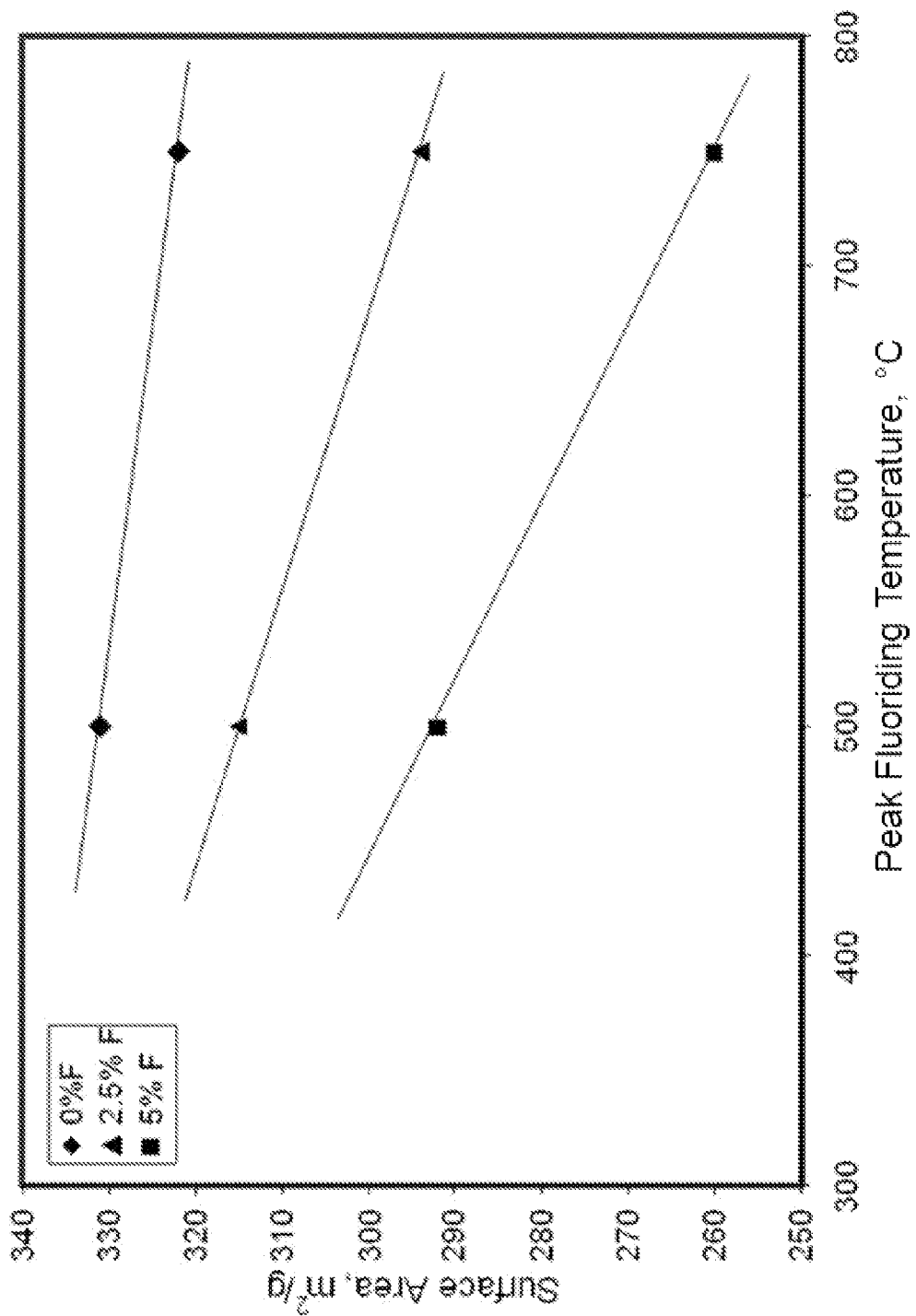

VAPOR PHASE PREPARATION OF FLUORIDED SOLID OXIDES

BACKGROUND OF THE INVENTION

The present invention relates generally to the field of olefin polymerization catalysis, supported catalyst compositions, methods for the polymerization and copolymerization of olefins, and polyolefins. More specifically, this invention relates to fluorided solid oxide activator-supports, methods for producing such fluorided solid oxide activator-supports, and to catalyst compositions employing these fluorided solid oxide activator-supports.

It would be beneficial to produce fluorided solid oxide activator-supports that would have increased surface area and increased catalyst activity in olefin polymerization processes, for example, using metallocene-based catalyst systems. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Processes for producing fluorided solid oxide activator-supports are disclosed and described herein. One such process for producing a fluorided solid oxide can comprise (a) calcining a solid oxide at a peak calcining temperature to produce a calcined solid oxide; and (b) contacting the calcined solid oxide at a peak fluoriding temperature with a vapor comprising a fluorine-containing compound to produce the fluorided solid oxide. In this process, the peak fluoriding temperature can be at least about 50° C. less than the peak calcining temperature.

Catalyst compositions containing these fluorided solid oxide activator-supports are also provided by the present invention. One such catalyst composition can comprise a transition metal compound, such as a metallocene compound, and a fluorided solid oxide activator-support. In one aspect, this catalyst composition can further comprise an optional organoaluminum compound, while in another aspect, the catalyst composition can further comprise an optional co-catalyst. Suitable optional co-catalysts can include, but are not limited to, aluminoxane compounds, organozinc compounds, organoboron or organoborate compounds, ionizing ionic compounds, and the like, or combinations thereof.

Catalyst compositions of the present invention can be used to polymerize olefins to form homopolymers, copolymers, terpolymers, and the like. One such process for polymerizing olefins in the presence of a catalyst composition of the present invention can comprise contacting the catalyst composition with an olefin monomer and optionally an olefin comonomer under polymerization conditions to produce an olefin polymer, wherein the catalyst composition comprises a transition metal compound, such as a metallocene compound, and a fluorided solid oxide activator-support. Other co-catalysts, including organoaluminum compounds, can be employed in this process.

Polymers produced from the polymerization of olefins, resulting in homopolymers or copolymers, for example, can be used to produce various articles of manufacture.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURE

FIG. 1 presents a plot of the surface area versus the peak fluoriding temperature for Examples 1-6.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claim. A "consisting essentially of" claim occupies a middle ground between closed claims that are written in a "consisting of" format and fully open claims that are drafted in a "comprising" format. For example, absent an indication to the contrary, describing a compound or composition as "consisting essentially of" is not to be construed as "comprising," but is intended to describe the recited component that includes materials which do not significantly alter the composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a catalyst system consisting of specific components; alternatively, consisting essentially of specific components; or alternatively, comprising the specific components and other non-recited components.

In this disclosure, while compositions and methods are often described in terms of "comprising" various components or steps, the compositions and methods can also "consist essentially of" or "consist of" the various components or steps, unless stated otherwise.

The terms "a," "an," and "the" are intended to include plural alternatives, e.g., at least one. For instance, the disclosure of "a solid oxide," "a fluorine-containing compound," etc., is meant to encompass one, or mixtures or combinations of more than one, solid oxide, fluorine-containing compound, etc., unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For example, a general reference to pentane includes n-pentane, 2-methylbutane, and 2,2-dimethylpropane; and a general reference to a butyl group includes a n-butyl group, a sec-butyl group, an iso-butyl group, and a t-butyl group.

In one aspect, a chemical "group" can be defined or described according to how that group is formally derived from a reference or "parent" compound, for example, by the number of hydrogen atoms removed from the parent compound to generate the group, even if that group is not literally synthesized in such a manner. These groups can be utilized as substituents or coordinated or bonded to a metal atom, oxygen atom, etc. By way of example, an "alkyl group" formally can be derived by removing one hydrogen atom from an alkane. The disclosure that a substituent, ligand, or other chemical moiety can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedures, unless specified otherwise or the context requires otherwise.

Various numerical ranges are disclosed herein. When Applicants disclose or claim a range of any type, Applicants' intent is to disclose or claim individually each possible number that such a range could reasonably encompass, including end points of the range as well as any sub-ranges and combinations of sub-ranges encompassed therein, unless otherwise specified. As a representative example, Applicants disclose that the processes provided herein can employ, in certain aspects, a peak fluoriding temperature that can be from about 60° C. to about 600° C. less than the peak calcining temperature. By a disclosure that the peak fluoriding temperature can be from about 60° C. to about 600° C. less than the peak calcining temperature, Applicants intend to recite that this temperature difference can be equal to about 60° C., about 75° C., about 100° C., about 150° C., about 200° C., about 250° C., about 300° C., about 350° C., about 400° C., about 450° C., about 500° C., about 550° C., or about 600° C. Additionally, the difference in temperature between the peak fluoriding temperature and the peak calcining temperature can be within any range from about 60° C. to about 600° C. (for example, the temperature difference can be from about 75° C. to about 200° C.), and this also includes any combination of ranges between about 60° C. and about 600° C. Likewise, all other ranges disclosed herein should be interpreted in a manner similar to this example.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

The term "substituted" when used to describe a group, for example, when referring to a substituted analog of a particular group, is intended to describe any non-hydrogen moiety that formally replaces a hydrogen atom in that group, and is intended to be non-limiting, unless otherwise specified. A group or groups can also be referred to herein as "unsubstituted" or by equivalent terms such as "non-substituted," which refers to the original group in which a non-hydrogen moiety does not replace a hydrogen atom within that group.

As used herein, the term "hydrocarbon" refers to a compound containing only carbon and hydrogen atoms. Other identifiers can be utilized to indicate the presence of particular groups, if any, in the hydrocarbon (e.g., halogenated hydrocarbon indicates that the presence of one or more halogen atoms replacing an equivalent number of hydrogen atoms in the hydrocarbon).

An "aromatic" compound is a compound containing a cyclically conjugated double bond system that follows the Hückel (4n+2) rule and contains (4n+2) pi-electrons, where n is an integer from 1 to 5. Aromatic compounds include "arenes" (hydrocarbon aromatic compounds, e.g., benzene, toluene, xylene, etc.) and "heteroarenes" (heteroaromatic compounds formally derived from arenes by replacement of one or more methine (—C=) carbon atoms of the cyclically conjugated double bond system with a trivalent or divalent heteroatom, in such a way as to maintain the continuous pi-electron system characteristic of an aromatic system and a number of out-of-plane pi-electrons corresponding to the Hückel rule (4n+2)). As disclosed herein, the term "substituted" can be used to describe an aromatic group, arene, or heteroarene, wherein a non-hydrogen moiety formally replaces a hydrogen atom in the compound, and is intended to be non-limiting, unless specified otherwise.

As used herein, the term "alkane" refers to a saturated hydrocarbon compound. Other identifiers can be utilized to indicate the presence of particular groups, if any, in the alkane (e.g., halogenated alkane indicates that the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. The alkane or alkyl group can be linear or branched, unless otherwise specified.

The term "alkene" refers to a linear or branched hydrocarbon olefin that has one carbon-carbon double bond. An "alkenyl group" is a univalent group derived from an alkene by removal of a hydrogen atom from any carbon atom of the alkene. Other identifiers can be utilized to further describe the position of the carbon-carbon double bond (e.g., a terminal alkenyl group).

The term "polymer" is used herein generically to include olefin homopolymers, copolymers, terpolymers, and so forth. A copolymer can be derived from an olefin monomer and one olefin comonomer, while a terpolymer can be derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also is meant to include all molecular weight polymers, and is inclusive of lower molecular weight polymers or oligomers. Applicants intend for the term "polymer" to encompass oligomers derived from any olefin monomer disclosed herein (as well from an olefin monomer and one olefin comonomer, an olefin monomer and two olefin comonomers, and so forth).

In like manner, the scope of the term "polymerization" includes homopolymerization, copolymerization, terpolymerization, etc., as well as processes that might also be referred to as oligomerization processes. Therefore, a copolymerization process would involve contacting an olefin monomer (e.g., ethylene) and an olefin comonomer (e.g., 1-hexene) to produce an olefin copolymer.

The term "co-catalyst" is used generally herein to refer to organoaluminum compounds that can constitute one component of a catalyst composition. Additionally, "co-catalyst" also refers to other optional components of a catalyst composition including, but not limited to, aluminoxanes, organoboron or organoborate compounds, and ionizing ionic compounds, and the like. The term "co-catalyst" is used regardless of the actual function of the compound or any chemical mechanism by which the compound may operate.

The terms "catalyst composition," "catalyst mixture," "catalyst system," and the like, do not depend upon the actual product or composition resulting from the contact or reaction of the initial components of the claimed catalyst composition/mixture/system, the nature of the active catalytic site, or the fate of the co-catalyst, the transition metal compound(s), any olefin monomer used to prepare a precontacted mixture, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The terms "contact product," "contacting," and the like, are used herein to describe compositions wherein the components are contacted together in any order, in any manner, and for any length of time. For example, the components can be contacted by blending or mixing. Further, unless otherwise specified, the contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Likewise, "contacting" two or more components can result in a reaction product or a reaction mixture. Consequently, depending upon the circumstances, a "contact product" can be a mixture, a reaction mixture, or a reaction product.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

DETAILED DESCRIPTION OF THE INVENTION

Various processes for producing a fluorided solid oxide are disclosed and described. One such process to produce a fluorided solid oxide activator-support can comprise (or consist essentially of, or consist of) (a) calcining a solid oxide at a peak calcining temperature to produce a calcined solid oxide, and (b) contacting the calcined solid oxide at a peak fluoriding temperature with a vapor comprising a fluorine-containing compound to produce the fluorided solid oxide. Typically, the peak fluoriding temperature can be at least about 50° C. less than the peak calcining temperature.

Generally, the features of any of the processes disclosed herein (e.g., the solid oxide, the conditions under which the calcining step is conducted (such as the peak calcining temperature), the fluorine-containing compound, the conditions under which the fluoriding step is conducted (such as the peak fluoriding temperature), the surface area of the fluorided solid oxide, among others) are independently described herein, and these features can be combined in any combination to further describe the disclosed processes. Moreover, other process steps can be conducted before, during, and/or after any of the steps listed in the disclosed processes, unless stated otherwise. Additionally, fluorided solid oxides produced in accordance with the disclosed methods/processes are within the scope of this disclosure and are encompassed herein.

The following steps in the disclosed processes for producing fluorided solid oxides can be performed using any suitable apparatus. For example, a fluidized bed is especially convenient, operated in either a batch or continuous manner. Alternatively, the process can be performed in a fixed bed, or in a tray or other still container, or by a rotary calciner, or any other suitable furnace-type equipment.

Step (a) of the process often can be referred to as the calcining step, and in the calcining step, a solid oxide can be calcined at a peak calcining temperature to produce a calcined solid oxide. The calcining step can be conducted at a variety of temperatures and time periods. For instance, the calcining step can be conducted at a peak calcining temperature in a range from about 400° C. to about 1000° C.; alternatively, from about 500° C. to about 1000° C.; alternatively, from about 500° C. to about 950° C.; alternatively, from about 600° C. to about 900° C.; alternatively, from about 550° C. to about 900° C.; alternatively, from about 550° C. to about 850° C.; or alternatively, from about 600° C. to about 750° C. In these and other aspects, these temperature ranges also are meant to encompass circumstances where the calcining step is conducted at a series of different temperatures (e.g., an initial calcining temperature, a peak calcining temperature), instead of at a single fixed temperature, falling within the respective ranges. For instance, the calcining step can start at an initial calcining temperature, and subsequently, the temperature of the calcining step can be increased to the peak calcining temperature, for example, a peak calcining temperature in a range from about 500° C. to about 1000° C., or from about 600° C. to about 750° C.

The duration of the calcining step is not limited to any particular period of time. Hence, the calcining step can be conducted, for example, in a time period ranging from as little as 45 minutes to as long as 12-24 hours, or more. The appropriate calcining time can depend upon, for example, the initial/peak calcining temperature, and the atmosphere under which calcining is conducted, among other variables. Generally, however, the calcining step can be conducted in a time period that can be in a range from about 45 minutes to about 18 hours, such as, for example, from about 45 minutes to about 15 hours, from about 1 hour to about 12 hours, from about 3 hours to about 12 hours, from about 3 hours to about 10 hours, or from about 5 hours to about 10 hours.

In one aspect, calcining of the solid oxide can be performed in an ambient atmosphere (e.g., an oxidizing atmosphere), for example, a dry ambient atmosphere. Hence, the calcining step can be performed in an atmosphere comprising air, a mixture of oxygen and air, a mixture of oxygen and an inert gas, and so forth. Since the calcining gas stream can comprise air, the calcining gas stream can comprise about 20-21 mole % oxygen. However, dilute oxygen calcining gas streams can be employed, such as those having less than about 15 mole %, or less than about 10 mole % oxygen. For example, suitable ranges for the mole % of oxygen in the calcining gas stream can include, but are not limited to, the following ranges: from about 0.1 to about 25 mole %, from about 1 to about 21 mole %, from about 2 to about 21 mole %, from about 1 to about 10 mole %, from about 15 to about 25 mole %, or from about 5 to about 15 mole %, and the like.

In another aspect, calcining of the solid oxide can be performed in a reducing atmosphere. The reducing atmosphere can comprise molecular hydrogen and/or carbon monoxide, either individually or in a mixture with air and/or an inert gas. In some aspects, molecular hydrogen and/or carbon monoxide can be the major component of the calcining gas stream, while in other aspects, molecular hydrogen and/or carbon monoxide can be a minor component. Any suitable amount of the reducing agent can be employed in the calcining gas stream. Accordingly, for example, the calcining gas stream can comprise (or consist essentially of, or consist of) molecular hydrogen and an inert gas (e.g., nitrogen), or alternatively, carbon monoxide and an inert gas.

In yet another aspect, calcining of the solid oxide can be performed in an inert atmosphere. Hence, the calcining gas stream can comprise (or consist essentially of, or consist of) an inert gas. The inert gas can be helium, neon, argon, nitrogen, carbon dioxide, water/steam, and the like, and this includes combination of two or more of these materials.

The solid oxide used to produce the fluorided solid oxide can comprise oxygen and one or more elements from Groups 2, 3, 4, 5, 6, 7, 8, 9, 10, 11, 12, 13, 14, or 15 of the periodic table, or comprising oxygen and one or more elements from the lanthanide or actinide elements (see e.g., Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For instance, the solid oxide can comprise oxygen and at least one element selected from Al, B, Be, Bi, Cd, Co, Cr, Cu, Fe, Ga, La, Mn, Mo, Ni, P, Sb, Si, Sn, Sr, Th, Ti, V, W, P, Y, Zn, and Zr.

Accordingly, suitable examples of solid oxide materials that can be used to form the fluorided solid oxides can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. This includes co-gels or co-precipitates of different solid oxide materials, or materials where one oxide is coated with another. The solid oxide of this invention can encompass oxide materials such as alumina, "mixed oxides" thereof such as silica-alumina, and combinations and mixtures thereof. The mixed oxides such as silica-alumina can be single or multiple chemical phases with more than one metal combined with oxygen to form the solid oxide. Examples of mixed oxides that can be used to form a fluorided solid oxide, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163, the disclosure of which is incorporated herein by reference in its entirety.

Accordingly, in one aspect of this invention, the solid oxide can comprise (or consist essentially of, or consist of) silica, alumina, silica-alumina, silica-coated alumina, aluminum phosphate, aluminophosphate, heteropolytungstate, titania, zirconia, magnesia, boria, zinc oxide, any mixed oxide thereof, or any combination thereof. In another aspect, the solid oxide can comprise silica, alumina, titania, zirconia, magnesia, boria, zinc oxide, any mixed oxide thereof, or any combination thereof. In yet another aspect, the solid oxide can comprise silica-alumina, silica-coated alumina, silica-titania, silica-zirconia, alumina-boria, or any combination thereof. In still another aspect, the solid oxide can comprise silica; alternatively, alumina; alternatively, silica-alumina; or alternatively, silica-coated alumina.

The silica-alumina which can be used in the present invention typically can have an alumina content from about 5 to about 95% by weight. According to one aspect of this invention, the alumina content of the silica-alumina can be from about 5 to about 50%, or from about 8% to about 30%, alumina by weight. In another aspect, high alumina content silica-alumina compounds can be employed, in which the alumina content of these silica-alumina compounds typically can range from about 60% to about 90%, or from about 65% to about 80%, alumina by weight. According to yet another aspect of this invention, the solid oxide component can comprise alumina without silica, and according to another aspect of this invention, the solid oxide component can comprise silica without alumina. Moreover, as provided hereinabove, the solid oxide can comprise a silica-coated alumina.

Solid oxides of the present invention generally have surface areas ranging from about 100 to about 1000 $m^2/g$. In some aspects, the surface area can fall within a range from about 150 to about 750 $m^2/g$, for example, from about 200 to about 600 $m^2/g$. The surface area of the solid oxide can range from about 250 to about 500 $m^2/g$ in another aspect of this invention. Solid oxides having surface areas of about 300 $m^2/g$, about 350 $m^2/g$, about 400 $m^2/g$, or about 450 $m^2/g$, can be employed in this invention.

The pore volume of the solid oxide is generally greater than about 0.5 mL/g. Often, the pore volume can be greater than about 0.75 mL/g, or greater than about 1 mL/g. In another aspect, the pore volume can be greater than about 1.2 mL/g. In yet another aspect, the pore volume can fall within a range from about 0.8 mL/g to about 1.8 mL/g, such as, for example, from about 1 mL/g to about 1.6 mL/g.

The solid oxides disclosed herein generally have average particle sizes ranging from about 10 microns to about 200 microns. In some aspects of this invention, the average particle size can fall within a range from about 25 microns to about 150 microns. For example, the average particle size of the solid oxide can be in a range from about 40 to about 120 microns.

Step (b) of the process for producing a fluorided solid oxide often can be referred to as the fluoriding step, and in this step, the calcined solid oxide can be contacted with a vapor comprising a fluorine-containing compound to produce the fluorided solid oxide. The fluoriding step can be conducted at a variety of temperatures and time periods. For instance, the fluoriding step can be conducted at a peak fluoriding temperature in a range from about 300° C. to about 700° C.; alternatively, from about 350° C. to about 700° C.; alternatively, from about 350° C. to about 650° C.; alternatively, from about 350° C. to about 600° C.; alternatively, from about 400° C. to about 650° C.; alternatively, from about 400° C. to about 600° C.; or alternatively, from about 450° C. to about 650° C. In these and other aspects, these temperature ranges also are meant to encompass circumstances where the fluoriding step is conducted at a series of different temperatures (e.g., an initial fluoriding temperature, a peak fluoriding temperature), instead of at a single fixed temperature, falling within the respective ranges. For instance, the fluoriding step can start at an initial fluoriding temperature, and subsequently, the temperature of the fluoriding step can be increased to the peak fluoriding temperature, for example, in a range from about 350° C. to about 650° C., or from about 400° C. to about 600° C.

The duration of the fluoriding step is not limited to any particular period of time. Hence, the fluoriding step can be conducted, for example, in a time period ranging from as little as 30 seconds to as long as 12-24 hours, or more. The appropriate duration of the fluoriding step can depend upon, for example, the initial/peak fluoriding temperature, the atmosphere under which fluoriding is conducted, and the amount of fluorine in the vapor stream, among other variables. Generally, however, the fluoriding step can be conducted in a time period that can be in a range from about 30 seconds to about 18 hours, such as, for example, from about 1 minute to about 15 hours, from about 3 minutes to about 10 hours, from about 10 minutes to about 8 hours, from about 15 minutes to about 8 hours, from about 30 minutes to about 3 hours, or from about 1 hour to about 5 hours, and the like.

In one aspect, fluoriding of the calcined solid oxide can be performed in an ambient atmosphere (e.g., an oxidizing atmosphere), for example, a dry ambient atmosphere. Hence, the vapor employed in the fluoriding step can comprise a fluorine-containing compound and air, a fluorine-containing compound and a mixture of oxygen and air, a fluorine-containing compound and mixture of oxygen and an inert gas, and so forth. Similar to the gas stream employed in the calcining step, the vapor used in the fluoriding step can contain any reasonable mole % of oxygen, but typical ranges can include from about 0.1 to about 25 mole %, from about 1 to about 21 mole %, from about 2 to about 21 mole %, from about 1 to about 10 mole %, from about 15 to about 25 mole %, or from about 5 to about 15 mole %, and the like.

In another aspect, fluoriding of the calcined solid oxide can be performed in a reducing atmosphere. In addition to a fluorine-containing compound, the vapor stream can comprise molecular hydrogen and/or carbon monoxide, either individually or in a mixture with air and/or an inert gas. Similar to the gas stream employed in the calcining step, the vapor used in the fluoriding step can contain any reasonable amount of a reducing agent. For example, the calcining gas stream can comprise (or consist essentially of, or consist of) a fluorine-containing compound, molecular hydrogen, and an inert gas (e.g., nitrogen), or alternatively, a fluorine-containing compound, carbon monoxide, and an inert gas.

In yet another aspect, fluoriding of the solid oxide can be performed in an inert atmosphere. Hence, in addition to the fluorine-containing compound, the vapor can comprise (or consist essentially of, or consist of) an inert gas. The inert gas can be helium, neon, argon, nitrogen, carbon dioxide, and the like, and this includes combination of two or more of these materials.

In certain aspects, the amount of the fluorine-containing compound in the vapor stream contacting the calcined solid oxide can be at least about 10 ppmv (ppm by volume), at least 100 ppmv, or at least 1% by volume. In some aspects, the fluorine-containing compound can represent substantially the entire vapor stream contacting the calcined solid oxide. More often, however, the amount of the fluorine-containing compound in the vapor stream contacting the calcined solid oxide can be less than about 20%, less than about 10%, or less than about 5%, by volume.

In one aspect, the fluorine-containing compound can be present in the vapor stream throughout the duration of the fluoriding step. For instance, about 25 ppmv, or about 100 ppmv, of the fluorine-containing compound in a stream of dry air can be contacted with the calcined solid oxide at particular peak fluoriding temperature (e.g., in the 350° C. to 650° C. range) and for a particular duration of the fluoriding step (e.g., in the 45 minute to 2 hour range). In another aspect, the fluorine-containing compound can be present in the vapor stream for only a portion of the duration of the fluoriding step, e.g., less than about 15 minutes. For instance, about 1% by volume, or about 5% by volume, of the fluorine-containing compound in a stream of dry air can be contacted with the calcined solid oxide at particular peak fluoriding temperature (e.g., in the 350° C. to 650° C. range) and for a particular portion of the duration of the fluoriding step (e.g., 30 seconds, 1 minute, 5 minutes, 10 minutes, etc.). For the remainder of the duration of the fluoriding step (e.g., total of 30 min, total of 1 hour, etc.), the vapor stream can contain only the dry air. Thus, the fluorine-containing compound can be present in the vapor stream for as little as about 30 seconds to as long as the complete duration of the fluoriding step. Often, the fluorine-containing compound can be present in the vapor stream for a period of time sufficient to result in a desired F loading on the fluorided solid oxide, and typically, is not oversupplied above that required to retain greater than about 95% of the F on the fluorided solid oxide (e.g., 99-100% by weight).

The fluorine-containing compound, in certain aspects, can comprise (i) a fluoroalkane or fluoroalkene of the formula $C_xH_yF_z$, wherein x is an integer from 1 to 8, y and z are integers such that $y+z=2x+n$, and wherein n is 0, 1, or 2; (ii) a fluoroaromatic compound (e.g., benzene, toluene, xylene, etc.), wherein at least one hydrogen atom is replaced with a F atom; or (iii) an alkyl or alkenyl ether wherein at least one alkyl or alkenyl group has a hydrogen atom replaced with a F atom; or any combination thereof.

In other aspects, the fluorine-containing compound can comprise a Freon or a fluorocarbon compound. For instance, suitable fluorine-containing compounds can include, but are not limited to, tetrafluoromethane, trifluoromethane, difluoromethane, fluoromethane, hexafluoroethane, pentafluoroethane, pentafluorodimethyl ether, 1,1,2,2-tetrafluoroethane, 1,1,1,2-tetrafluoroethane, bis(difluoromethyl)ether, 1,1,2-trifluoroethane, 1,1,1-trifluoroethane, methyl trifluoromethyl ether, 2,2,2-trifluoroethyl methyl ether, 1,2-difluoroethane, 1,1-difluoroethane, fluoroethane, octafluoropropane, 1,1,2,2,3,3,3-heptafluoropropane, trifluoromethyl 1,1,2,2-tetrafluoroethyl ether, 1,1,1,2,3,3,3-heptafluoropropane, trifluoromethyl 1,2,2,2-tetrafluoroethyl ether, 1,1,1,2,2,3-hexafluoropropane, 1,1,1,2,3,3-hexafluoropropane, 1,1,1,3,3,3-hexafluoropropane, 1,2,2,2-tetrafluoroethyl difluoromethyl ether, hexafluoropropane, pentafluoropropane, 1,1,2,2,3-pentafluoropropane, 1,1,2,3,3-pentafluoropropane, 1,1,1,2,3-pentafluoropropane, 1,1,1,3,3-pentafluoropropane, methyl pentafluoroethyl ether, difluoromethyl 2,2,2-trifluoroethyl ether, difluoromethyl 1,1,2-trifluoroethyl ether, 1,1,2,2-tetrafluoropropane, methyl 1,1,2,2-tetrafluoroethyl ether, trifluoropropane, difluoropropane, fluoropropane, octafluorocyclobutane, decafluorobutane, 1,1,1,2,2,3,3,4,4-nonafluorobutane, 1,1,1,2,3,4,4,4-octafluorobutane, 1,1,1,2,2,3,3-heptafluorobutane, perfluoropropyl methyl ether, perfluoroisopropyl methyl ether, 1,1,1,3,3-pentafluorobutane, perfluorohexane (tetradecafluorohexane), tetrafluoroethylene, 1,1-difluoroethylene, fluoroethylene, hexafluoropropylene, 2,3,3,3-tetrafluoropropene, hexafluoropropene trimer, and the like, as well as combinations thereof.

In another aspect, the fluorine-containing compound can comprise (or consist essentially of, or consist of) tetrafluoromethane, trifluoromethane, difluoromethane, fluoromethane, hexafluoroethane, pentafluoroethane, tetrafluoroethane, trifluoroethane, difluorethane, octafluoropropane, perfluorohexane, perfluorobenzene, pentafluorodimethyl ether, bis(difluoromethyl)ether, methyl trifluoromethyl ether, trifluoroethyl methyl ether, perfluoroacetic anhydride, trifluoroethanol, silicon tetrafluoride ($SiF_4$), hydrogen fluoride (HF), fluorine gas ($F_2$), boron trifluoride ($BF_3$), and the like, as well as mixtures or combinations thereof. For instance, the fluorine-containing compound can comprise (or consist essentially of, or consist of) tetrafluoromethane; alternatively, trifluoromethane; alternatively, difluoromethane; alternatively, fluoromethane; alternatively, hexafluoroethane; alternatively, pentafluoroethane; alternatively, tetrafluoroethane; alternatively, trifluoroethane; alternatively, difluorethane; alternatively, octafluoropropane; alternatively, perfluorohexane; alternatively, perfluorobenzene; alternatively, pentafluorodimethyl ether; alternatively, bis(difluoromethyl)ether; alternatively, methyl trifluoromethyl ether; alternatively, trifluoroethyl methyl ether; alternatively, perfluoroacetic anhydride; alternatively, trifluoroethanol; alternatively, silicon tetrafluoride; alternatively, hydrogen fluoride; or alternatively, fluorine gas.

In yet another aspect, the fluorine-containing compound can comprise tetrafluoroethane, perfluorohexane, perfluoroacetic anhydride, and the like, or any combination thereof. In still another aspect, the fluorine-containing compound can comprise tetrafluoroethane, or alternatively, the fluorine-containing compound can comprise perfluorohexane.

In accordance with some aspects of this invention, the fluorided solid oxide can be, or can comprise, fluorided alumina, fluorided silica-alumina, fluorided silica-zirconia, fluorided silica-titania, fluorided silica-coated alumina, and the like, or a combination thereof. In other aspects, the fluorided solid oxide can comprise (or consist essentially of, or consist of) fluorided alumina; alternatively, fluorided silica-alumina; alternatively, fluorided silica-zirconia; alternatively, fluorided silica-titania; or alternatively, fluorided silica-coated alumina.

The fluorided solid oxide generally can contain from about 1 to about 20 wt. % fluorine (F), based on the total weight of the fluorided solid oxide. In particular aspects provided herein, the fluorided solid oxide can contain from about 3 to about 15 wt. % fluorine, from about 3 to about 10 wt. % fluorine, from about 4 to about 12 wt. % fluorine, from about 5 to about 12 wt. % fluorine, or from about 5 to about 10 wt. % fluorine, based on the total weight of the fluorided solid oxide.

Optionally, the fluorided solid oxide can be impregnated with a metal, such as a transition metal, at any stage within the process, as well pre-impregnating the solid oxide, or post-impregnated the fluorided solid oxide, using various techniques and methods known to those of skill in the art. The metal can be a transition metal from Groups 3 to 11 of the periodic table, such as titanium, zirconium, hafnium, vanadium, molybdenum, tungsten, iron, cobalt, nickel, copper, scandium, yttrium, lanthanum, and the like, or combinations thereof. For instance, the fluorided solid oxide can be impregnated with titanium, zirconium, hafnium, vanadium, nickel, and the like, either singly or in combination. If employed, the weight percentage of the transition metal in the fluorided solid oxide, based on the total weight of the metal-containing fluorided solid oxide, often can be in a range from about 0.01 to about 10 wt. %, from about 0.1 to about 9 wt. %, from about 0.1 to about 5 wt. %, from about 0.1 to about 3 wt. %, or from about 0.3 to about 2 wt. %.

In various aspects contemplated herein, the processes for producing a fluorided solid oxide can be performed with a higher temperature calcination followed by a lower temperature fluorination. While not wishing to be bound by theory, applicants believe that calcining the solid oxide first a higher temperature, followed by a lower temperature fluoridation step can result in a fluorided solid oxide with higher pore volume, higher surface area, and/or higher resultant catalyst activity. Therefore, in one aspect of this invention, the peak fluoriding temperature can be at least about 50° C. less than the peak calcining temperature. In another aspect, the peak fluoriding temperature can be at least about 60° C., at least about 75° C., at least about 85° C., at least about 100° C., or at least about 150° C., less than the peak calcining temperature. In yet another aspect, the peak fluoriding temperature can be from about 50° C. to about 600° C. less than the peak calcining temperature, or from about 60° C. to about 600° C. less than the peak calcining temperature. In still another aspect, the peak fluoriding temperature can be from about 50° C. to about 400° C., from about 60° C. to about 300° C., from about 75° C. to about 400° C., from about 75° C. to about 300° C., from about 85° C. to about 250° C., or from about 100° C. to about 200° C., less than the peak calcining temperature. For instance, representative and non-limiting examples of the peak calcining temperature and the peak fluoriding temperature can include the following: a peak calcining temperature of 750° C. and a peak fluoriding temperature of 500° C., a peak calcining temperature of 750° C. and a peak fluoriding temperature of 600° C., a peak calcining temperature of 700° C. and a peak fluoriding temperature of 500° C., a peak calcining temperature of 800° C. and a peak fluoriding temperature of 500° C., or a peak calcining temperature of 600° C. and a peak fluoriding temperature of 500° C., and the like.

Fluorided solid oxides of the present invention generally can have surface areas (e.g., determined using the BET method) of at least about 250 m$^2$/g, and more often, at least about 300 m$^2$/g. For instance, fluorided solid oxides having surface areas over 310 m$^2$/g, over 325 m$^2$/g, or over 350 m$^2$/g, can be produced using the processes disclosed herein. Typical ranges of surface area for the fluorided solid oxide can include, but are not limited to, the following: from about 250 to about 1000 m$^2$/g, from about 300 to about 1000 m$^2$/g, from about 275 to about 700 m²/g, from about 300 to about 650 m²/g, from about 300 to about 500 m²/g, or from about 325 to about 700 m²/g, and the like.

In a particular aspect, the surface area of the fluorided solid oxide produced by the process disclosed herein (e.g., with a peak fluoriding temperature of least about 50° C. less than the peak calcining temperature) can be at least about 5% greater than a surface area of a fluorided solid oxide obtained by performing the contacting step (fluoriding step) at the peak calcining temperature, instead of at the peak fluoriding temperature. In this aspect, any other conditions used to produce the fluorided solid oxide are to be held constant for this comparison, e.g., same calcining time, same calcining atmosphere, same contacting/fluoriding time, etc. Hence, the processes disclosed herein can provide fluorided solid oxides with higher surface areas than processes in which the peak fluoriding temperature is not at least 50° C. less than the peak calcining temperature. Generally, the surface area of the fluorided solid oxide produced by the process disclosed herein (at a peak calcination temperature of X, and peak fluoriding temperature at least 50° C. less than X) can be at least about 5% greater than the surface area of a fluorided solid oxide obtained by performing the contacting step (fluoriding step) at the same peak calcining temperature of X, but in some aspects, the surface area can be at least about 6% greater, at least about 7% greater, at least about 8% greater, at least about 9% greater, at least about 10% greater, etc., such as from about 5-20% greater, about 5-15% greater, or about 5-12% greater.

Fluorided solid oxides of the present invention generally can have pore volumes (e.g. using the t-plot method) of at least about 1 mL/g, and more often, at least about 1.3 mL/g. For instance, fluorided solid oxides having pore volumes over 1.4 mL/g, over 1.5 mL/g, or over 1.7 mL/g, can be produced using the processes disclosed herein. Typical ranges of pore volume for the fluorided solid oxide can include, but are not limited to, the following ranges: from about 1 to about 2 mL/g, from about 1.2 to about 2 mL/g, from about 1.3 to about 2 mL/g, from about 1.3 to about 1.8 mL/g, or from about 1.3 to about 1.7 mL/g, and the like.

Fluorided solid oxides disclosed herein generally can have average particle sizes ranging from about 10 microns to about 200 microns. In some aspects of this invention, the average particle size can fall within a range from about 25 microns to about 150 microns. For example, the average particle size of the fluorided solid oxide can be in a range from about 40 to about 120 microns.

In various aspects contemplated herein, the processes for producing a fluorided solid oxide can further include one or more optional steps performed prior to the calcination step, and/or one or more optional intermediate steps performed after the calcination step but before the fluoriding step, and/or one or more optional steps performed after the fluoriding step. As a non-limiting example, a purging step can be performed after the calcination step, and this purging step can comprise contacting the calcined solid oxide with a purging stream comprising (or consisting essentially of, or consisting of) an inert gas, such as helium, neon, argon, or nitrogen, or a mixture thereof. The purging step can be performed at the peak calcining temperature, at ambient temperature, and/or used to transition from the peak calcining temperature to ambient temperature. As another non-limiting example, a storage step can be performed after the fluoriding step, and this storage step can comprise contacting the fluorided solid oxide with a storage gas stream comprising (or consisting essentially of, or consisting of) an inert gas, such as helium, neon, argon, or nitrogen, or a mixture thereof. The storage step can be performed while cooling from the peak fluoriding temperature to ambient temperature and/or during storage of the fluorided solid oxide prior to its use in a catalyst system, for example.

Catalyst Compositions

Catalyst compositions disclosed herein employ a fluorided solid oxide activator-support, and the fluorided solid oxide can be produced using any of the processes described herein. According to one aspect of the present invention, a catalyst composition is provided which can comprise a transition metal compound and a fluorided solid oxide. In accordance with this and other aspects of the present invention, it is contemplated that the catalyst compositions disclosed herein can contain more than one transition metal compound and/or more than one solid oxide activator-support.

The transition metal compound can comprise, for example, a transition metal (one or more than one) from Groups IIIB-VIIIB of the Periodic Table of the Elements. In one aspect, the transition metal compound can comprise a Group III, IV, V, or VI transition metal, or a combination of two or more transition metals. The transition metal compound can comprise chromium, titanium, zirconium, hafnium, vanadium, or a combination thereof, or can comprise chromium, titanium, zirconium, hafnium, or a combination thereof, in other aspects. Accordingly, the transition metal compound can comprise chromium, or titanium, or zirconium, or hafnium, either singly or in combination. The transition metal compound can comprise, for example, a metallocene compound and/or a chromium compound.

Various transition metal-based catalyst systems known to a skilled artisan are useful in the polymerization of olefins. These include, but are not limited to, Ziegler-Natta based catalyst systems (e.g., Ziegler-based catalyst systems), chromium-based catalyst systems, metallocene-based catalyst systems, Phillips catalyst systems, Ballard catalyst systems, coordination compound catalyst systems, post-metallocene catalyst systems, and the like, including combinations thereof. The fluorided solid oxides produced herein can be substituted for the activator, and/or support, and/or carrier typically used in such catalyst systems. Examples of representative and non-limiting transition metal-based catalyst systems in which fluorided solid oxides can be employed include those disclosed in the U.S. Pat. Nos. 3,887,494, 3,119,569, 4,053,436, 4,981,831, 4,364,842, 4,444,965, 4,364,855, 4,504,638, 4,364,854, 4,444,964, 4,444,962, 3,976,632, 4,248,735, 4,297,460, 4,397,766, 2,825,721, 3,225,023, 3,226,205, 3,622,521, 3,625,864, 3,900,457, 4,301,034, 4,547,557, 4,339,559, 4,806,513, 5,037,911, 5,219,817, 5,221,654, 4,081,407, 4,296,001, 4,392,990, 4,405,501, 4,151,122, 4,247,421, 4,460,756, 4,182,815, 4,735,931, 4,820,785, 4,988,657, 5,436,305, 5,610,247, 5,627,247, 3,242,099, 4,808,561, 5,275,992, 5,237,025, 5,244,990, 5,179,178, 4,855,271, 5,179,178, 5,275,992, 3,900,457, 4,939,217, 5,210,352, 5,436,305, 5,401,817, 5,631,335, 5,571,880, 5,191,132, 5,480,848, 5,399,636, 5,565,592, 5,347,026, 5,594,078, 5,498,581, 5,496,781, 5,563,284, 5,554,795, 5,420,320, 5,451,649, 5,541,272, 5,705,478, 5,631,203, 5,654,454, 5,705,579, 5,668,230, 6,300,271, 6,831,141, 6,653,416, 6,613,712, 7,294,599, 6,355,594, 6,395,666, 6,833,338, 7,417,097, 6,548,442, 7,312,283, 7,226,886, and 7,619,047, each of which is incorporated herein by reference in its entirety.

In some aspects of this invention, optional co-catalysts can be employed. For example, a catalyst composition comprising a transition metal compound (e.g., a metallocene compound) and a fluorided solid oxide can further comprise an optional co-catalyst. Suitable co-catalysts in this aspect can be include, but are not limited to, organoaluminum compounds, aluminoxane compounds, organozinc compounds, organoboron or organoborate compounds, ionizing ionic compounds, and the like, or combinations thereof. More than one co-catalyst can be present in the catalyst composition. Examples of such co-catalysts are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety.

This invention further encompasses methods of making catalyst compositions disclosed herein, such as, for example, contacting the respective catalyst components in any order or sequence. It can beneficial in certain circumstances to pre-contact some of the components of the catalyst composition or to contact the components of the catalyst composition in a particular order or sequence.

Catalyst compositions of the present invention generally have a catalyst activity greater than about 500 grams of olefin polymer (homopolymer, copolymer, etc., as the context requires) per gram of fluorided solid oxide (FSO) per hour. This activity can be abbreviated as gP/gFSO/hr. In another aspect, the catalyst activity can be greater than about 1,000, greater than about 2,500, or greater than about 5,000 gP/gFSO/hr. In still another aspect, catalyst compositions of this invention can be characterized by having a catalyst activity greater than about 6,000, or greater than about 8,000, gP/gFSO/hr. Yet, in another aspect, the catalyst activity can be greater than about 10,000 gP/gFSO/hr. This activity is measured under slurry polymerization conditions using isobutane as the diluent, at a polymerization temperature of about 95° C. and a reactor pressure of about 400 psig. The reactor pressure is largely controlled by the pressure of the monomer, e.g., the ethylene pressure, but other contributors to the reactor pressure can include hydrogen gas (if hydrogen is used), isobutane vapor, and comonomer gas or vapor (if a comonomer is used).

In a particular aspect, the catalyst activity of a catalyst system containing the fluorided solid oxide produced by the process disclosed herein (at a peak calcination temperature of X, and peak fluoriding temperature at least 50° C. less than X) can be at least about 5% greater than that of a similar catalyst system containing a fluorided solid oxide obtained by performing the contacting step (fluoriding step) at the same peak calcining temperature of X, instead of at the peak fluoriding temperature. In this aspect, any other conditions used to produce the fluorided solid oxide and any polymerization conditions used to produce the polymer are to be held constant for this comparison. For instance, the conditions can be as described in Examples 7-17 that follow.

Hence, the processes disclosed herein can provide fluorided solid oxides that result in catalyst systems with higher activity than processes in which the peak fluoriding temperature is not at least 50° C. less than the peak calcining temperature. Generally, the catalyst activity of a catalyst system containing the fluorided solid oxide produced by the process disclosed herein can be at least about 5% greater than that of a similar catalyst system containing a fluorided solid oxide obtained by performing the contacting step (fluoriding step) at the peak calcining temperature, but in some aspects, the catalyst activity can be at least about 7% greater, at least about 10% greater, at least about 12% greater, at least about 15% greater, at least about 20% greater, etc., such as from about 5-100% greater, about 7-75% greater, or about 10-50% greater.

Olefin Monomers and Olefin Polymers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization, terpolymerization, etc., reactions using an olefin monomer with at least one different olefinic compound. As previously disclosed, polymerization processes are meant to encompass oligomerization processes as well.

As an example, any resultant ethylene copolymers, terpolymers, etc., generally can contain a major amount of ethylene (>50 mole percent) and a minor amount of comonomer (<50 mole percent). Comonomers that can be copolymerized with ethylene often have from 3 to 20 carbon atoms, or from 3 to 10 carbon atoms, in their molecular chain.

Acyclic, cyclic, polycyclic, terminal ($\alpha$), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene also can be employed as a monomer or as a comonomer. In an aspect, the olefin monomer can be a $C_2$-$C_{20}$ olefin; alternatively, a $C_2$-$C_{20}$ $\alpha$-olefin; alternatively, a $C_2$-$C_{12}$ olefin; alternatively, a $C_2$-$C_{10}$ $\alpha$-olefin; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can be, for example, ethylene or propylene, which is copolymerized with at least one comonomer (e.g., a $C_2$-$C_{20}$ $\alpha$-olefin, a $C_3$-$C_{20}$ $\alpha$-olefin, etc.). According to one aspect, the olefin monomer in the polymerization process can be ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to one aspect, the comonomer can comprise an $\alpha$-olefin (e.g., a $C_3$-$C_{10}$ $\alpha$-olefin), while in another aspect, the comonomer can comprise 1-butene, 1-pentene, 1-hexene, 1-octene, 1-decene, styrene, or any combination thereof. For example, the comonomer can comprise 1-butene, 1-hexene, 1-octene, or a combination thereof.

Generally, the amount of comonomer introduced into a polymerization reactor to produce the copolymer can be from about 0.01 to about 50 weight percent of the comonomer based on the total weight of the monomer and comonomer. According to another aspect, the amount of comonomer introduced into a polymerization reactor can be from about 0.01 to about 40 weight percent comonomer based on the total weight of the monomer and comonomer. In still another aspect, the amount of comonomer introduced into a polymerization reactor can be from about 0.1 to about 35 weight percent comonomer based on the total weight of the monomer and comonomer. Yet, in another aspect, the amount of comonomer introduced into a polymerization reactor can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization reaction. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect, at least one monomer/reactant can be ethylene, so the polymerization reaction can be a homopolymerization involving only ethylene, or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer (or oligomer) produced from any olefin monomer (and optional comonomer(s)) described herein. For example, the olefin polymer can comprise an ethylene homopolymer, a propylene homopolymer, an ethylene copolymer (e.g., ethylene/α-olefin, ethylene/1-butene, ethylene/1-hexene, ethylene/1-octene, etc.), a propylene copolymer, an ethylene terpolymer, a propylene terpolymer, and the like, including combinations thereof. In one aspect, the olefin polymer can have a unimodal molecular weight distribution, while in another aspect, the olefin polymer can have a bimodal or multimodal molecular weight distribution.

Polymerization Reactor Systems

The disclosed catalyst systems are intended for any olefin polymerization process using various types of polymerization reactors, polymerization reactor systems, and polymerization reaction conditions. As used herein, "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer can be contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, load-out, laboratory analysis, and process control. Depending upon the desired properties of the olefin polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 110° C., depending upon the type of polymerization reactor. In some reactor systems, the polymerization temperature generally can be within a range from about 70° C. to about 90° C., or from about 75° C. to about 85° C.

Suitable pressures will also vary according to the reactor and polymerization type. The pressure for liquid phase polymerizations in a loop reactor typically can be less than 1000 psig. The pressure for gas phase polymerization can be in the 200 to 500 psig range. High pressure polymerization in tubular or autoclave reactors generally can be conducted at about 20,000 to 75,000 psig. Polymerization reactors also can be operated in a supercritical region occurring at generally higher temperatures and pressures. Operation above the critical point of a pressure/temperature diagram (supercritical phase) can offer advantages.

This invention is also directed to, and encompasses, the polymers produced by any of the polymerization processes disclosed herein. Articles of manufacture can be formed from, and/or can comprise, the polymers produced in accordance with this invention.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

Examples 1-6

In Examples 1-6, experiments were conducted to determine the impact of (i) the amount of fluorine impregnated on the solid oxide and (ii) the peak fluoriding temperature on the resultant surface area of the solid oxide. Approximately 10 g of a silica-alumina solid oxide (W.R. Grace 13-120, 30% alumina, initially 380 $m^2/g$ surface area and 1.3 mL/g pore volume) were placed in a vertical 2-inch diameter quartz tube fitted with a sintered quartz distribution plate at the bottom. Dry air was then added from the bottom of the tube through the distribution plate to fluidize the solid oxide at a gas velocity of 0.1 ft/sec. The tube was placed in an electric furnace and the temperature was raised at 400° C./hr to 750° C., where it was held for three hours. Afterward, the temperature was changed to the desired peak fluoriding temperature, where the calcined solid oxide was fluorine treated by injection of perfluorohexane vapor in an amount to result in 0 wt. % (no perfluorohexane), 2.5 wt. %, or 5 wt. % fluorine, based on the total weight of the solid oxide. The evaporation of the perfluorohexane into the dry air and reaction with the solid oxide took approximately 5 min. Then, the solid oxide (or fluorided solid oxide) was held at the peak fluoriding temperature for 1 hr, cooled and stored under dry nitrogen. The peak fluoriding temperatures and fluorine contents are summarized in Table I.

FIG. 1 illustrates the resultant surface area (determined via BET method) of each of Examples 1-6, after using the peak fluoriding temperatures and with the wt. % F shown in Table I. All samples were first calcined at 750° C., then subjected to either the same or a lower peak fluoriding temperature. Generally, as shown in FIG. 1, the surface area decreased as the peak fluoriding temperature increased. Additionally, the surface areas decreased as the wt. % F increased, but this decrease was less at the lower peak fluoriding temperatures. At zero F loading, for example, the surface area only dropped minimally as the peak fluoriding temperature increased from 500° C. to 750° C. However, fluoriding at 750° C. greatly lowered the surface area as the F loading was increased from 0% F to 5% F. Applying 5% F at the peak fluoriding temperature of 750° C. resulted in a surface area of about 260 $m^2/g$, whereas applying 5% F at the peak fluoriding temperature of 500° C. resulted in a surface area of approximately 292 $m^2/g$, an increase of over 12%. Thus, higher surface areas were unexpectedly achieved by calcining first at a higher temperature, then fluoriding at a lower temperature.

TABLE I

Examples 1-6.

| Example | Weight % Fluorine | Peak Fluoriding Temperature (° C.) |
| --- | --- | --- |
| 1 | 0 | 500 |
| 2 | 0 | 750 |
| 3 | 2.5 | 500 |
| 4 | 2.5 | 750 |
| 5 | 5 | 500 |
| 6 | 5 | 750 |

Examples 7-17

In Examples 7-17, experiments were conducted to determine the impact of different peak calcining temperatures, peak fluoriding temperatures, and fluorine-containing compounds on the resultant catalyst activity of a catalyst system containing a fluorided solid oxide. Certain properties of Examples 7-17 are summarized in Table II.

Polymerization experiments were conducted as follows. First, 10 g samples of silica-coated alumina (Sasol, 28% silica and 72% alumina, initially 420 m$^2$/g surface area and 1.6 mL/g pore volume) were calcined and fluorided at the temperatures shown in Table II, using substantially the same procedure as described above for Examples 1-6. Several different fluorine-containing compounds were tested (FC1—perfluoroacetic anhydride; FC2—perfluorohexane; FC3—Teflon; FC4—tetrafluoroethane), each by vaporizing the fluorine-containing compound into the dry air stream used to fluidize the solid oxide for a period of about 5 min at the peak fluoriding temperature (total duration of fluoriding step was 1 hour). In the case of FC3, a charge of solid Teflon was placed into the solid oxide fluidizing bed at the fluoriding temperature, where it decomposed, releasing fluorine-containing decomposition products. In some cases, the exit gas obtained during the fluoridation step was bubbled through 0.1N NaOH solution to capture any F that did not react with the solid oxide, and this F concentration was then determined in the sparge solution by ion chromatography.

Polymerization catalyst activity was evaluated in a 2.2-L stainless steel autoclave reactor equipped with marine propeller rotating at 400 rpm, and a reactor temperature control system. After purging the reactor with dry nitrogen, about 0.03 g of the respective fluorided solid oxide was added to the reactor. Then, a solution of metallocene in toluene was added (3 mg of the compound shown below), followed by 0.5 mL of 1M triisobutylaluminum cocatalyst.

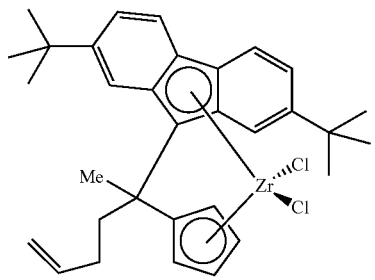

The reactor was closed, and 1 L of isobutane liquid was added. The temperature was increased to the desired polymerization temperature of 95° C., and ethylene was supplied on demand to maintain constant pressure of 400 psig for the 30-min duration of the experiment. The reactor was subsequently vented and cooled, and the polymer product was dried and weighed. The base activity of the catalyst was determined as the grams of PE produced per g of fluorided solid oxide charged per hour (g/g/hr). Since the experiments were performed at different times, reference to a "control" polymerization run performed at a point in time close to each of experiments was used to normalize the base catalyst activities. Thus, the catalyst activity of each experiment was converted to a catalyst activity based on the percentage of the activity of the control run.

The fluorided solid oxide for the control runs used the same silica-coated alumina as Examples 7-17, but the silica-coated alumina was impregnated with an alcohol solution of ammonium bifluoride, resulting in 7 wt. % F based on the weight of the solid oxide. After calcining as described in Examples 1-6 in dry air at 600° C. for 3 hours, the fluorided solid oxide control was cooled and stored under dry nitrogen. Polymerization catalyst activity was tested in the same manner as that for Examples 7-17.

Table II summarizes certain aspects of Examples 7-17. The wt. % F was based on the weight of the fluorided solid oxide. For the samples tested, the wt. % F retained by the fluorided solid oxide (and not present in the exit gas and captured in the NaOH solution) was unexpectedly between 99% and 100%, indicating that all or virtually all of the F from the fluorine-containing compound impregnated the solid oxide and was not lost in the exit gas. Most surprisingly, the highest catalyst activities (as a percentage of the activity of the control) were obtained when the solid oxide was calcined initially at a higher temperature, and then fluoride-treated at a lower temperature. For instance, Examples 11, 14, 15, and 17 each showed unexpectedly superior catalyst activity with peak fluoriding temperatures from 100° C. to 300° C. less than the peak calcining temperature. Additionally, all of the F from the fluorine-containing compound was absorbed on the solid oxide support. Table II also suggests that, under the same peak calcining and fluoriding temperatures, fluorine-containing compound FC4 resulted in higher catalyst activity than FC1 and FC2 (see Examples 7, 8, and 16).

TABLE II

| Examples 7-17. | | | | | | |
|---|---|---|---|---|---|---|
| Example | Fluorine-Containing Compound | Peak Calcining Temperature (° C.) | Peak Fluoriding Temperature (° C.) | Weight % Fluorine | Weight % Fluorine Retained | Catalyst Activity (% of Control) |
| 7 | FC1 | 600 | 600 | 6.7 | 100 | 89 |
| 8 | FC2 | 600 | 600 | 6.7 | 100 | 84 |
| 9 | FC1 | 600 | 400 | 6.7 | 99.8 | 89 |
| 10 | FC2 | 600 | 300 | 6.7 | 100 | 5 |
| 11 | FC2 | 700 | 500 | 8.1 | 100 | 107 |
| 12 | FC1 | 600 | 150 | 6.7 | — | 1 |
| 13 | FC3 | 600 | 400 | 6.7 | 99.1 | — |
| 14 | FC2 | 750 | 600 | 6.7 | — | 170 |
| 15 | FC4 | 600 | 500 | 6.9 | 100 | 129 |
| 16 | FC4 | 600 | 600 | 6.9 | 100 | 118 |
| 17 | FC4 | 800 | 500 | 10.0 | 100 | 151 |

We claim:

1. A process to produce a fluorided solid oxide, the process comprising:
    (a) calcining a solid oxide at a peak calcining temperature to produce a calcined solid oxide; and
    (b) contacting the calcined solid oxide at a peak fluoriding temperature with a vapor comprising a fluorine-containing compound to produce the fluorided solid oxide;
    wherein the peak fluoriding temperature is at least about 50° C. less than the peak calcining temperature, and
    wherein the surface area of the fluorided solid oxide produced by the process is at least about 5% greater than a surface area of a fluorided solid oxide obtained by performing the contacting step at the peak calcining temperature.

2. The process of claim 1, wherein:
    the peak calcining temperature is in a range from about 500° C. to about 1000° C.;
    the peak fluoriding temperature is in a range from about 350° C. to about 650° C.;
    the peak fluoriding temperature is from about 60° C. to about 600° C. less than the peak calcining temperature; or
    any combination thereof.

3. The process of claim 1, wherein:
    the peak calcining temperature is in a range from about 600° C. to about 750° C.;
    the peak fluoriding temperature is in a range from about 400° C. to about 600° C.;
    the peak fluoriding temperature is from about 75° C. to about 400° C. less than the peak calcining temperature; or
    any combination thereof.

4. The process of claim 1, wherein:
    the fluorine-containing compound comprises perfluorohexane, perfluoroacetic anhydride, tetrafluoroethane, or a combination thereof; and/or
    the fluorided solid oxide comprises fluorided alumina, fluorided silica-alumina, fluorided silica-zirconia, fluorided silica-titania, fluorided silica-coated alumina, or a combination thereof.

5. The process of claim 1, wherein the fluorine-containing compound comprises a fluorocarbon.

6. The process of claim 1, wherein the solid oxide comprises silica, alumina, titania, zirconia, magnesia, boria, silica-alumina, silica-coated alumina, silica-titania, silica-zirconia, alumina-boria, or any combination thereof.

7. The process of claim 6, wherein the fluorided solid oxide comprises fluorided silica-alumina, fluorided silica-coated alumina, fluorided alumina, or a combination thereof.

8. The process of claim 1, wherein step (a) and step (b) are performed in an oxidizing atmosphere.

9. The process of claim 1, wherein:
    the fluorided solid oxide comprises from about 5 to about 12 wt. % fluorine, based on the weight of the fluorided solid oxide; and/or
    the vapor comprises from about 100 ppmv to about 20 volume % fluorine-containing compound.

10. The process of claim 1, wherein:
    the contacting in step (b) is performed for a time period of less than about 8 hr; and
    the fluorine-containing compound is present in the vapor for less than about 15 min.

11. The process of claim 1, wherein the fluorided solid oxide has:
    a pore volume in a range from about 1.2 to about 2 mL/g; and
    a surface area in a range from about 275 to about 700 m$^2$/g.

12. The process of claim 1, wherein the catalyst activity of a catalyst system containing the fluorided solid oxide produced by the process is at least about 5% greater than that of a catalyst system containing a fluorided solid oxide obtained by performing the contacting step at the peak calcining temperature.

13. A fluorided solid oxide produced by the process of claim 1.

14. A catalyst composition comprising a transition metal compound and the fluorided solid oxide of claim 13.

15. A polymerization process comprising contacting the catalyst composition of claim 14 with an olefin monomer and optionally an olefin comonomer under polymerization conditions to produce an olefin polymer.

16. A process to produce a fluorided solid oxide, the process comprising:
    (a) calcining a solid oxide at a peak calcining temperature in an oxidizing atmosphere to produce a calcined solid oxide; and
    (b) contacting the calcined solid oxide at a peak fluoriding temperature with a vapor comprising a fluorine-containing compound and oxygen to produce the fluorided solid oxide;
    wherein the peak fluoriding temperature is from about 50° C. to about 600° C. less than the peak calcining temperature, and
    wherein the surface area of the fluorided solid oxide produced by the process is at least about 5% greater than a surface area of a fluorided solid oxide obtained by performing the contacting step at the peak calcining temperature.

17. The process of claim 16, wherein:
    the peak calcining temperature is in a range from about 550° C. to about 900° C.;
    the peak fluoriding temperature is in a range from about 350° C. to about 650° C.; and
    the peak fluoriding temperature is from about 75° C. to about 300° C. less than the peak calcining temperature.

18. The process of claim 16, wherein:
    the fluorine-containing compound comprises perfluorohexane, perfluoroacetic anhydride, tetrafluoroethane, or a combination thereof; and
    the fluorided solid oxide comprises fluorided silica-alumina, fluorided silica-coated alumina, fluorided alumina, or a combination thereof.

19. The process of claim 16, wherein:
    the surface area of the fluorided solid oxide produced by the process is from about 5% to about 15% greater than a surface area of a fluorided solid oxide obtained by performing the contacting step at the peak calcining temperature; and
    the catalyst activity of a catalyst system containing the fluorided solid oxide produced by the process is at least about 10% greater than that of a catalyst system containing a fluorided solid oxide obtained by performing the contacting step at the peak calcining temperature.

* * * * *